June 12, 1934.    P. L. BELLASCHI    1,962,379
ELECTRICAL APPARATUS
Filed March 29, 1933.    2 Sheets-Sheet 1

WITNESSES:
E. C. Leiding.
Wm. C. Groome

INVENTOR
Peter L. Bellaschi.
BY Franklin E. Hardy
ATTORNEY

June 12, 1934.    P. L. BELLASCHI    1,962,379
ELECTRICAL APPARATUS
Filed March 29, 1933    2 Sheets-Sheet 2
Fig. 4.
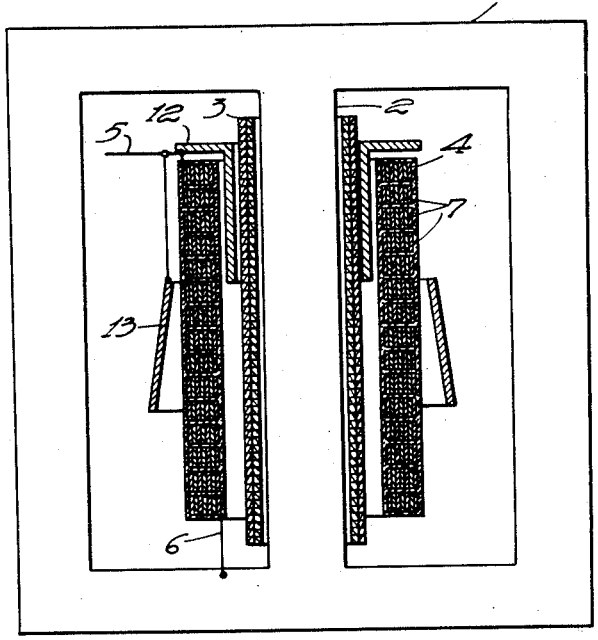
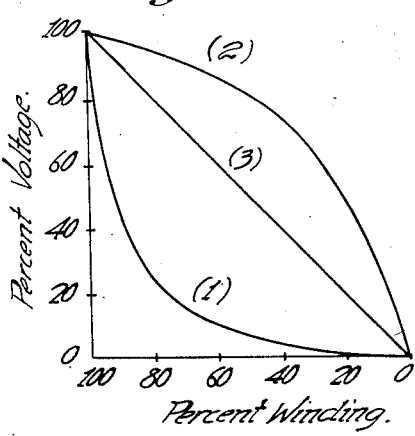
Fig. 5.
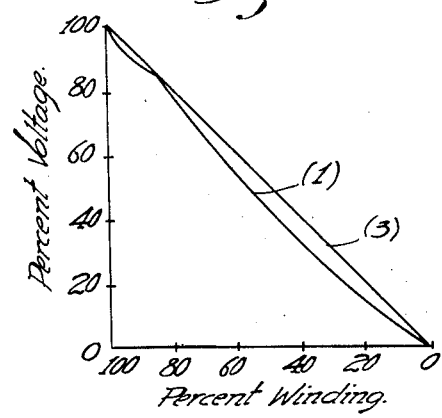
Fig. 6.
WITNESSES:
E. C. Leiding
Wm. C. Groome
INVENTOR
Peter L. Bellaschi.
BY Franklin E. Hardy
ATTORNEY Patented June 12, 1934

1,962,379

UNITED STATES PATENT OFFICE 1,962,379

ELECTRICAL APPARATUS

Peter L. Bellaschi, Sharon, Pa., assignor to Westinghouse Electric & Manufacturing Company, East Pittsburgh, Pa., a corporation of Pennsylvania Application March 29, 1933, Serial No. 663,361

7 Claims. (Cl. 175—356)

My invention relates to electrical inductive apparatus and more particularly to means for maintaining a desired electrostatic distribution of surge voltages in the windings of electrical apparatus.

In the windings of electrical apparatus, such as transformers, that are connected to a transmission line, the voltage between the terminals of the winding varies uniformly from one end of the winding to the other under normal frequency and voltage conditions of the system. However, during certain conditions of the system, such as may be caused by lightning or by switching operations on the transmission line, a high-voltage surge may occur on the transmission line and enter the transformer winding.

In windings of the usual construction, a voltage surge will not immediately distribute itself along the winding in a manner to establish a uniform voltage gradient, but its initial distribution produces a high concentration of voltage stress on parts of the winding connected near the line terminal. This initial voltage gradient results from the values of the electrostatic conditions existing between the winding and ground and between adjacent portions of the winding such as between different winding turns or groups of turns.

Because of the inductance of the winding, a redistribution of energy from the electrostatic state takes place in the winding causing oscillations of the voltage values therein about its final or uniformly distributed value that are caused by the inductance and capacity of the winding. The amplitude of the oscillations will initially correspond to the difference between the initial voltage and final voltage distribution along the winding. These oscillations create successive voltage stresses between adjacent parts of the winding and between the winding and ground.

In the usual winding construction, the conductors and coils of the winding are so small that satisfactory means for applying sufficient insulation to withstand the voltage stresses are not readily available. If sufficient insulating material is applied about the conductors the space factor between the conductors will become so large as to affect the efficiency of the design. It is, therefore, desirable to provide means for lessening the voltage stresses between the several parts of the winding that are caused by the concentration of surge voltages, in order to produce satisfactory operation of the apparatus.

Fundamentally any winding consists of a magnetic network of inductance elements interlinked to an electrostatic network of capacity elements. Briefly stated, the surge voltage characteristics of a winding depend on the combined energy storage characteristics of the capacity elements and of the inductive elements of the network representing the winding as well as on the dissipative characteristics of the entire winding. Thus in case of a sudden application of voltage to the network, such as may result from lightning or from switching surges, the voltage in the winding becomes initially distributed in accordance with its capacity network. After a given time interval, however, which depends on the time constants of the network, the current penetrates the inductance of the winding and the voltage redistributes itself along the winding as a result of such current flow. It is this initial and subsequent redistribution between the electrostatic and electromagnetic energies stored in the winding which gives rise to the transient phenomena resulting in abnormal voltage stresses in the winding. The interchange of energy from electrostatic to electromagnetic energy and vice versa decreases in intensity and amount with an increase in time, because of the energy losses in the winding, until eventually the voltage in the winding becomes uniformly distributed in accordance with the uniform distribution of the inductance in the network.

An object of my invention is to provide means for protecting the winding of an electrical apparatus from the transient voltage distribution effect of a surge entering the winding.

Another object of my invention is to provide electrostatic plates in an electrical apparatus so positioned and dimensioned as substantially to neutralize, or compensate for, the capacity current from the winding to ground, upon the occurrence of a rapid change in voltage across the winding of electrical apparatus.

A further object of my invention is to provide for a substantially uniform distribution of surge voltage throughout an electrical winding upon the occurrence of a voltage surge, by employing means for eliminating the capacitance current to ground from a portion of a winding and means for compensating for the capacity current to ground from another portion of the winding by supplying such capacity current directly to that portion of the winding.

In the drawings, Figure 1 is a diagram showing the combined inductive and capacity network circuit of an electric winding of the usual type.

Fig. 4 is a vertical sectional view of a transformer winding showing a modification of the application of the external and internal shields or electrostatic plates shown in Fig. 2 and Figs. 5 and 6 are diagrams illustrating voltage distribution curves.

Figure 1:
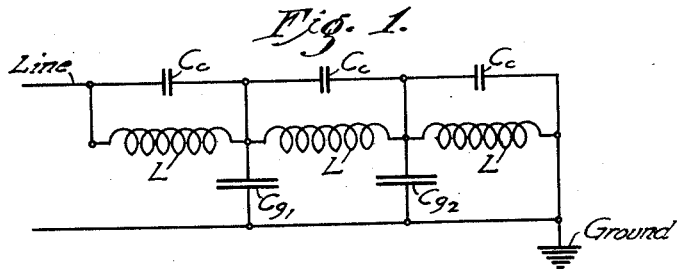

From a practical point of view the combined network of inductance and capacity elements corresponding to the electrical winding may be represented schematically as in Fig. 1 which is shown as comprising three meshes or parts of winding elements that are representative of the distributed capacity and inductance of the winding and the capacity to ground from various parts of the winding.

In Fig. 1, the parts L represent the inductance of portions of the winding, $C_c$ represents the capacities between these portions of the winding, or groups of winding turns, corresponding to the three parts into which the winding has, for convenience, been arbitrarily divided, and $C_{g1}$ and $C_{g2}$ represent the capacity to ground from these portions of the winding.

The primary result desired in the design of a shielded winding is to secure a substantially uniform voltage distribution throughout the winding and at the same time to so dispose the insulating material as to ensure an economic structure with high surge strength characteristics. It is well known that, in a winding connected between a high voltage terminal and a grounded terminal, the capacity to ground of the winding is relatively greater and is more detrimental in disturbing the desired voltage gradient toward the high voltage or line end of the winding, and becomes of less practical importance toward the grounded end of the winding.

Figure 2:
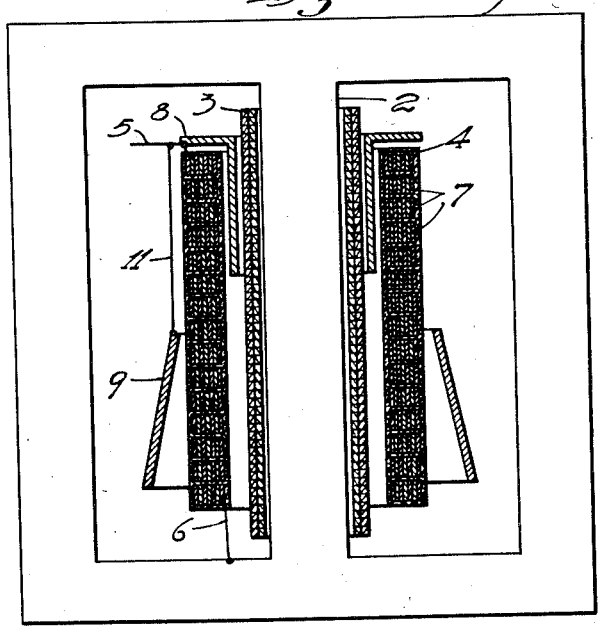
Fig. 2 is a view in vertical section of a transformer to which internal and external shields are applied adjacent the high voltage winding.

Referring to Fig. 2, a transformer structure is shown comprising a core 1 of magnetic material having a winding leg 2 about which is positioned a low voltage winding 3 and a high voltage winding 4 that is connected between a high voltage terminal 5 and a grounded terminal 6.

As illustrated, the high voltage winding 4 is made up of a number of individual coils 7 placed one above the other to form a winding stack and connected in series between the winding terminals. An electrostatic plate or shield 8 is provided extending across the face of the upper coil of the winding 4 and into the high-to-low space between the windings 3 and 4 for a portion of the length of the winding. Except for a slot in the shield 8 to prevent its forming a short circuiting turn around the winding leg of the core structure, it extends completely about the winding leg and is connected to the high voltage terminal 5 of the winding. A second shield 9 is provided which, except for a similar vertical slot, extends completely about the high voltage winding 4 and is connected by the conductor 11 to the high voltage terminal 5. The shield 9 is shown as flaring toward its lower end, thus increasing in distance from the winding 4 toward the portion thereof more remote from the high-voltage terminal 5, or, as the capacitance current to ground from the winding 4 decreases.

Figure 3:
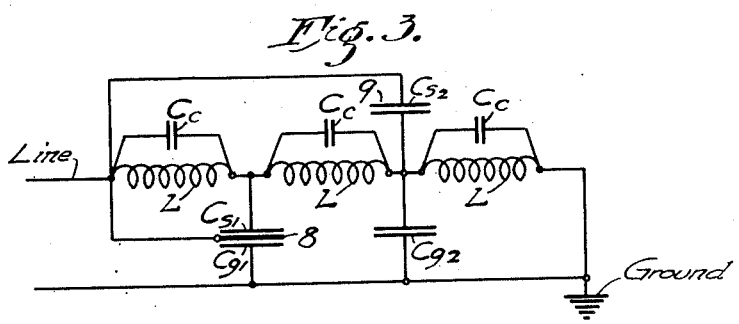
Fig. 3 is a diagram showing the equivalent network circuit of a winding to which both external and internal shields have been applied.

The shield or set of shields in the high-to-low space between the windings 3 and 4 adjacent the high voltage end thereof are for the purpose of substantially eliminating the capacity current to ground from that portion of the high voltage winding along which such shields extend, and the shield, or if desired, series of shields 9, positioned about a portion of the winding 4 having a lower voltage to ground and connected to the high voltage terminal 5 is for the purpose of compensating for the remaining ground capacity of the winding as shown schematically in Fig. 3.

In Fig. 3 the quantities L and $C_c$ represent the inductance of the winding segments and the capacity between segments of the winding as in Fig. 1. $C_{g1}$ represents the capacity to ground of the winding near the high voltage end thereof, which is substantially eliminated by means of the shield 8 that establishes a capacity from the shield to the winding represented by $C_{s1}$. The quantity $C_{g2}$ represents the winding capacity to ground from a part of the winding relatively nearer the ground end of the winding than that designated $C_{g1}$, and adjacent which the external shield 9 is positioned about the winding 4. A capacity exists between the shield 9 and the winding and the shield is so designed that the capacitance current forming across this capacitance from the shield to the winding corresponds in value to the current flowing from the winding to ground across the capacity $C_{g2}$.

It will be seen that in placing the shield 8 in a space between a portion of the high voltage winding and ground or the low voltage winding, the capacity current to ground from the winding is substantially eliminated from that portion of the winding and that spacing shield 9 about a portion of the high voltage winding, the capacity current to ground from that portion of the winding is supplied to the winding directly from the line terminal thereof.

An application to a single stack core type column of the external and internal shields described in respect to Fig. 2 is shown in Fig. 4. The shields are so dimensioned and positioned as to eliminate the capacity current to ground from the high voltage end of the winding 4 and to supply the current to ground from an adjacent portion of the winding through the external shield. In this form of shielding structure the surge voltage distribution, originally very poor, is improved substantially to a uniform distribution. In this structure, however, the shields 12 and 13 are so positioned as to protect a smaller part of the total winding than do the shields 8 and 9, and no attempt is made to adjust the voltage distribution along the lower voltage end of the winding. Since, however, the surge voltage distribution of the ordinary winding is especially bad at the high voltage end thereof (see curve 1, Fig. 5), shielding the portions shown in Fig. 4 will substantially correct the voltage distribution of the winding and in many cases give substantially good voltage distribution for practical purposes.

In Fig. 5 the curve 1 illustrates the initial voltage distribution of a steep-front high-voltage surge along the usual electrical winding. The distribution voltage then oscillates between the limits of curves 1 and 2 until a final straight line gradient curve 3 in Figs. 5 and 6, is established. In Fig. 6, curve 1 illustrates substantially the initial voltage distribution along a winding when the electrostatic plates comprising my invention are employed.

Modifications may be made in the arrangement of parts illustrated and described without departing from the spirit of my invention, and I do not wish to be limited other than by the scope of the appended claims.

I claim as my invention:

1. In electrical induction apparatus having a winding, means for providing a substantially uniform dielectric field throughout the length of said winding comprising a plurality of electrostatic plates, one of said plates being positioned between one portion of the winding and ground for the purpose of eliminating the capacitance current to ground, and another plate being positioned adjacent another portion of the winding for the purpose of compensating for the capacity to ground.

2. In electrical induction apparatus having a winding, means for maintaining the voltage distribution of the capacity network of the winding to correspond substantially to the voltage distribution of the inductive network of the winding comprising an electrostatic plate positioned along one end of the winding between it and ground and connected to the winding terminal to neutralize the capacity to ground from that portion of the winding, and an electrostatic plate positioned adjacent another portion of the winding to compensate for the flow of charging current to ground from that portion of the winding.

3. In electrical induction apparatus, a core of magnetic material having a winding leg, a low-voltage winding about said winding leg, a high-voltage winding about said low voltage winding, means for substantially neutralizing the capacity to ground from a portion of the high-voltage winding comprising an electrostatic plate extending along the winding in the space between the high-voltage and low-voltage windings, and an electrostatic plate surrounding another portion of the winding for supplying the capacitance current to ground for that portion of the winding, said plates being so dimensioned electrically that the voltage distribution of the capacity network of the winding corresponds susbtantially to the voltage distribution of the inductive network of the winding.

4. In an electrical apparatus, an electrical winding comprising a continuous stack of coils arranged upon a common axis and connected in series between a high-voltage terminal and a grounded terminal, means for producing a substantially straight line gradient along the winding upon the occurrence of a high-voltage surge on the winding comprising means for neutralizing the flow of capacity current from the high-voltage end of the winding and means for supplying charging current to the low-voltage end of the winding.

5. In an electrical apparatus, an electrical winding comprising a continuous stack of coils arranged upon a common axis and connected in series between a high-voltage terminal and a grounded terminal, means for producing a substantially straight line gradient along the winding upon the occurrence of a high-voltage surge on the winding comprising an electrostatic plate connected to the high-voltage terminal and extending along a portion of the winding adjacent the inner surface thereof for neutralizing the capacity to ground of the winding portion, and an electrostatic plate connected to the high-voltage terminal surrounding another portion thereof for supplying charging current to that portion of the winding.

6. The combination, in an electrical induction apparatus having a winding connected between a grounded terminal and a high-voltage terminal, of means for protecting said winding from the effect of surge voltages comprising a line static plate extending across the high-voltage end of the winding and along the interior of the winding for reducing the charging current to ground from the winding, and an electrostatic plate surrounding the low voltage end of the winding for increasing the flow of charging current to the winding, said plates being connected to the high-voltage terminal and so dimensioned that the voltage distribution of the capacity network of the winding corresponds to the voltage distribution of the inductance network of the winding.

7. The combination, in an electrical induction apparatus having a winding comprising a continuous stack of winding turns arranged along a common axis and connected between a grounded terminal and a high-voltage terminal, of means for protecting said winding from the effect of surge voltages comprising a line static plate extending along the interior of the winding adjacent the high-voltage end of the winding, and an electrostatic plate extending along the exterior of the winding adjacent the low-voltage end of the winding, said plates being connected to the high-voltage terminal and so dimensioned as to provide a substantially uniform dielectric field throughout the length of the winding upon the occurrence of a voltage surge.

PETER L. BELLASCHI.